US007503611B2

(12) United States Patent
Arquevaux

(10) Patent No.: US 7,503,611 B2
(45) Date of Patent: Mar. 17, 2009

(54) VEHICLE WITH A TAILGATE

(75) Inventor: Laurent Arquevaux, Sully sur Loire (FR)

(73) Assignee: ArvinMeritor Light Vehicle Systems - France, Sully-sur-Loire (FR)

(*) Notice: Subject to any disclaimer, the term of this patent is extended or adjusted under 35 U.S.C. 154(b) by 322 days.

(21) Appl. No.: 11/412,696

(22) Filed: Apr. 27, 2006

(65) Prior Publication Data

US 2006/0255621 A1 Nov. 16, 2006

(30) Foreign Application Priority Data

Apr. 28, 2005 (FR) .................................. 05 04290

(51) Int. Cl.
*B62D 33/027* (2006.01)

(52) U.S. Cl. ........................................................ 296/56

(58) Field of Classification Search .................. 296/50, 296/56, 146.1, 147, 146.8, 146.9
See application file for complete search history.

(56) References Cited

U.S. PATENT DOCUMENTS 5,944,376 A 8/1999 Buchanan, Jr.
6,120,080 A * 9/2000 Hori et al. ..................... 296/56
6,142,551 A * 11/2000 Ciavaglia et al. .............. 296/56
6,298,604 B1 * 10/2001 Rogers et al. ................. 49/340
6,318,025 B1 * 11/2001 Sedlak ........................ 49/341
6,382,706 B2 * 5/2002 Yuge et al. ............... 296/146.4
6,669,268 B2 * 12/2003 Oberheide ............... 296/146.8
6,755,458 B1 6/2004 Oberheide
7,144,066 B2 * 12/2006 Omori et al. ............. 296/146.8
2001/0035725 A1 11/2001 Mintgen et al.
2002/0005650 A1 * 1/2002 Rogers et al. ................. 296/56
2003/0085589 A1 * 5/2003 Oberheide ............... 296/146.8
2003/0146644 A1 * 8/2003 Sakai et al. .............. 296/146.8
2004/0124662 A1 7/2004 Cleland et al.
2004/0232723 A1 * 11/2004 Sera et al. ................ 296/146.8
2005/0001444 A1 * 1/2005 Sakai et al. .................... 296/56
2005/0017539 A1 * 1/2005 Ihashi et al. ............. 296/146.8

OTHER PUBLICATIONS

French Search Report dated Nov. 24, 2005.

* cited by examiner

*Primary Examiner*—H Gutman
(74) *Attorney, Agent, or Firm*—Carlson, Gaskey & Olds

(57) ABSTRACT

A vehicle includes a body and a tailgate coupled to the body by a hinge. The tailgate is moveable between a closed position and an open position. The vehicle also includes two cylinders for exerting a force on the tailgate with respect to the body. One of the cylinders is actuated by a drive device, and the lever arm of the cylinder actuated by the drive device with respect to the hinge is greater than the lever arm of the other cylinder with respect to the hinge in the closed position of the tailgate. The cylinder actuated by the drive device can develop a greater torque for opening the tailgate, facilitating the opening of the tailgate by a user since the cylinder actuated by the drive device allows for the movement of the tailgate.

20 Claims, 4 Drawing Sheets

VEHICLE WITH A TAILGATE

REFERENCE TO RELATED APPLICATION

This application claims priority to French Patent Application FR 05 04 290 filed on Apr. 28, 2005.

BACKGROUND OF THE INVENTION

This invention relates generally to a vehicle with a tailgate.

A vehicle equipped with a tailgate may include two cylinders that counterbalance the weight of the tailgate. The cylinders assist the user in moving the tailgate from a closed position to an open position and allow the tailgate to be immobilized in the fully open position.

Operating the tailgate is not always easy from an ergonomic point of view. Furthermore, when the user arrives with arms full of luggage, it is desirable to be able to use a remote control to open the tailgate.

There is a need for a tailgate that is easier to open.

SUMMARY OF THE INVENTION

The invention proposes a vehicle including a body and a tailgate coupled to the body by a hinge. The tailgate is moveable between a closed position and an open position, and two cylinders bias the tailgate with respect the body. One of the cylinders is actuated by a drive device. When the tailgate is closed, the lever arm of the cylinder actuated by the drive device with respect to the hinge is greater than the lever arm of the other cylinder with respect to the hinge.

According to one embodiment, the cylinder actuated by the drive device is designed to apply torque biasing the tailgate towards the open position when the tailgate is in the closed position. According to one embodiment, the cylinders are each designed to exert a torque around the hinge, in opposite directions to each other, when the tailgate is in the closed position. According to one embodiment, the cylinders are each designed to apply a torque around the hinge, in the same direction as each other, when the tailgate is in the open position. According to one embodiment, the cylinders are designed to apply an average torque biasing the tailgate towards the open position when the tailgate is in the closed position.

According to one embodiment, the drive device includes a cable operated by a motor, and the cylinder actuated by the drive device is designed to be extended or retracted by the cable. According to one embodiment, the cylinder actuated by the drive device includes a piston and a tube. The piston has a male thread and the tube has a female thread which cooperates with the male thread. The piston is rotatably driven by the drive device, which drives the tube in translation. According to one embodiment, the drive device includes a motor and an electronic control unit associated with the motor. The electronic control unit is equipped with an anti-pinch function and/or an anti-collision function for the tailgate movements. According to one embodiment, the cylinders are coupled to the body and to the tailgate.

According to one embodiment, the vehicle includes a flange connected to the tailgate. The cylinders are coupled to the flange at points that are not symmetrical with respect to a longitudinal plane of symmetry of the vehicle. According to one embodiment, the vehicle includes a flange connected to the body. The cylinders are coupled to the flange at points that are not symmetrical with respect to a longitudinal plane of symmetry of the vehicle.

BRIEF DESCRIPTION OF THE DRAWINGS

Other characteristics and advantages of the invention will become apparent on reading the following detailed description of the embodiments of the invention, given as an example only and with reference to the drawings, which show.

DETAILED DESCRIPTION OF THE INVENTION

The invention proposes a vehicle including a tailgate moved rotatably with respect to a hinge on the body of the vehicle with the help of two cylinders for biasing or exerting a force on the tailgate. One of the cylinders is actuated by a drive device. In the closed position of the tailgate, the lever arm of the cylinder actuated by the drive device with respect to the hinge pin is greater than the lever arm of the other cylinder with respect to the hinge. For a given thrust, this allows the cylinder activated by the drive device to develop greater torque with respect to the hinge in order to open the tailgate. This minimizes the effort required of the drive device to initiate opening of the tailgate, and therefore the opening of the tailgate is facilitated.

Figure 1:
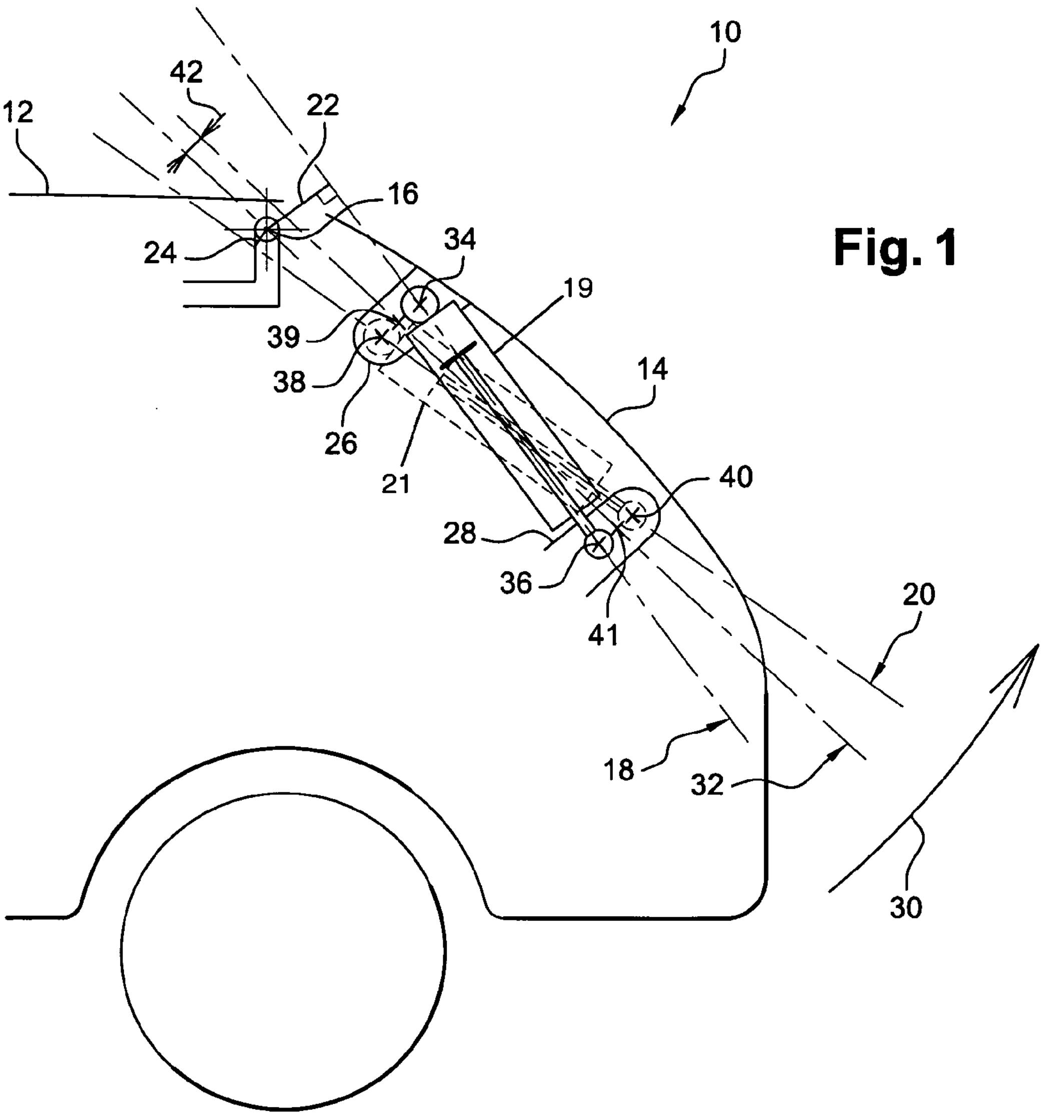
FIG. 1 illustrates a diagrammatic cross-sectional representation of a vehicle according to the invention.

FIG. 1 shows a diagrammatic cross-sectional representation of a vehicle 10 according to the invention. The vehicle 10 includes a body 12 and a tailgate 14 coupled to the body 12 by a hinge 16. The tailgate 14 is moveable between a closed position shown in FIG. 1 and an open position shown in FIG. 2. In the example in FIG. 1, the tailgate 14 is hinged on an upper edge, and the tailgate 14 is moved towards the open position by undergoing a counter-clockwise rotational movement indicated by the arrow 30 around the hinge 16.

The vehicle 10 also includes cylinders 19 and 21, and FIG. 1 shows the lines of action 18 and 20 of the cylinders 19 and 21, respectively. The cylinders 19 and 21 exert a force on the tailgate 14, in the sense that the cylinders 19 and 21 allow the tailgate 14 to be moved with respect to the body 12 (rotatably around the hinge 16) to open the tailgate 14, and in the sense that the cylinders 19 and 21 allow for the braking of the movement of the tailgate 14 with respect to the body 12 (rotatably around the hinge 16) for closure of the tailgate 14. The tailgate 14 may be operated manually or automatically by activation of a control on the vehicle or a remote control.

In a manual mode, the cylinders 19 and 21 facilitate the operation of opening the tailgate 14 by the user once the user has initiated the opening of the tailgate 14. The cylinders 19 and 21 facilitate the lifting of the tailgate 14. Once the tailgate 14 has reached the open position, the cylinders 19 and 21 immobilize the tailgate 14 in the open position and prevent it from returning in an uncontrolled manner towards the closed position.

In an automatic mode, one of the cylinders 19 and 21 is actuated by a drive device. This facilitates the operation of the tailgate 14 by the user since the user no longer has to open the tailgate 14 manually. For example, the user may initiate actuation of the cylinder 19 and 21 by the drive device using a remote control. The remote control sends a signal that initiates the opening of a lock that was holding the tailgate 14 in the closed position. Once the lock is open, the drive device actuates one of the cylinders 19, which causes the tailgate 14 to move from the closed position to the open position. The vehicle may include two cylinders 19 and 21 actuated by a drive device. Preferably, for reasons of cost, only the cylinder 19 is actuated by a drive device. The operation of the cylinder 19 driven by the drive device will be described in greater detail with respect to FIGS. 3 and 4.

The cylinders 19 and 21 are connected both to the tailgate 14, for example by a flange 26, and to the body 12, for example by a flange 28. Thus, the cylinders 19 and 21 are supported on the body 12 by the flange 28 and exert a force on the tailgate 14 by the flange 26, which lifts the tailgate 14 as indicated by the arrow 30. In the example in FIG. 1, and in the following description, the flange 28 is lower than the flange 26.

The lines of action 18 and 20 of the cylinders 19 and 21 are shown in FIG. 1. Each cylinder 19 and 21 has a line of action 18 and 20, respectively, developing torque with a lever arm 22 and 24, respectively, differing with respect to the hinge 16. The cylinder 19 has a lever arm 22 greater than the lever arm 24 developed by the cylinder 21. The cylinders 19 and 21 are therefore not arranged symmetrically with respect to a longitudinal plane of symmetry of the vehicle. This is particularly the case when the tailgate 14 is in the closed position.

Figure 2:
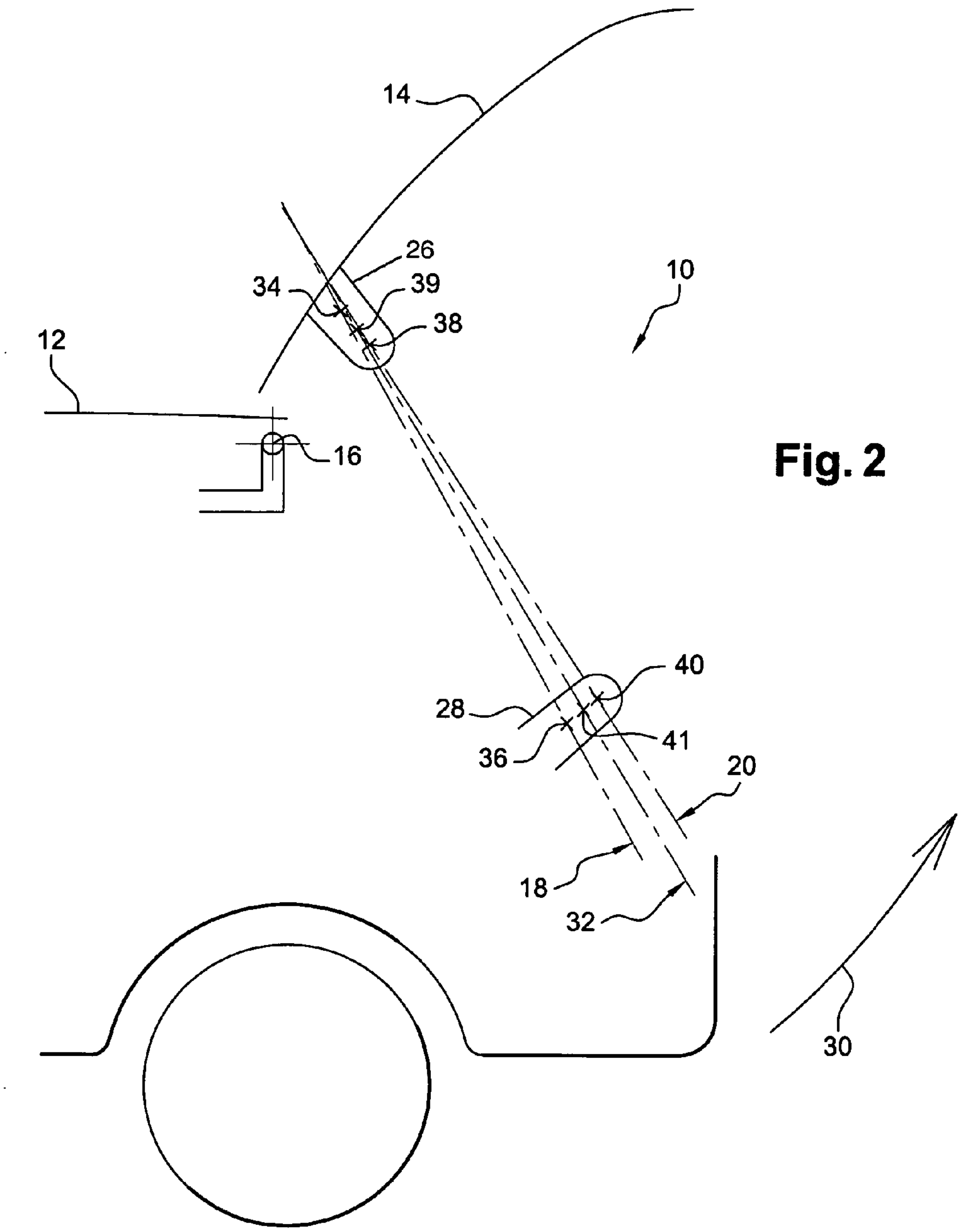
FIG. 2 illustrates a representation of the vehicle in FIG. 1 with a tailgate in an open position.

FIG. 2 shows a representation of the vehicle in FIG. 1 with the tailgate 14 in an open position. Between FIG. 1 and FIG. 2, the tailgate 14 has been opened as indicated by the arrow 30. The cylinders 19 and 21 have lines of action 18 and 20 that have different respective orientations.

The cylinders 19 and 21 are coupled to one of the flanges at points that are not symmetrical with respect to a longitudinal plane of symmetry of the vehicle (a plane that includes the longitudinal axis of the vehicle and is perpendicular to a plane of travel of the vehicle). This allows for different lever arms to be obtained depending on the cylinder. The cylinders 19 and 21 may also be coupled to the two flanges 26 and 28 at points that are not symmetrical with respect to the longitudinal plane of symmetry of the vehicle. This allows for the lever arms 22 and 24 of the cylinders 19 and 21 to be more easily adjusted.

Preferably, the cylinder 19 has a lever arm 22 with respect to the hinge 16 that is greater than the lever arm 24 of the cylinder 21 and is actuated by the drive device. This allows the force developed by the drive device to actuate the cylinder 19 to be reduced. This therefore allows for the power of the drive device to be reduced. In FIG. 1 and 2, the line of action 18 passes through points 34 and 36 of the flanges 26 and 28, respectively. The cylinder 19 is therefore supported on the point 36 and pushes the point 34 rotatably around the hinge 16. The rotation of the point 34 counter-clockwise around the hinge 16 allows for torque to be developed to open the tailgate 14, as indicated by the arrow 30. The further the point 34 turns around the hinge 16, the further the tailgate 14 opens. The torque developed by the cylinder is at its maximum when the point 34 passes through a horizontal line passing through the hinge 16. In the open position of the tailgate 14 (FIG. 2), the cylinders 19 and 21 hold it open at its limit stop. In the rest of the description, this torque developed by the cylinder 19 to move the tailgate 14 from the closed position to the open position will be defined as positive.

The line of action 20 corresponding to the other cylinder 21 passes through the points 38 and 40 of the flanges 26 and 28, respectively. The cylinder 21 is therefore supported on the point 40 and biases the point 38 rotatably around the hinge 16. However, in the closed position of the tailgate 14 in FIG. 1, the cylinder 21 develops a negative torque. In this position of the tailgate 14, the cylinders 19 and 21 are designed to exert torque around the hinge 16 in opposite directions. In the FIG. 1 position, the torque of the cylinder 21 therefore opposes the torque of the cylinder 19. However, as the lever arm 24 of the cylinder 21 is less than the lever arm 22 of the cylinder 19, the cylinders 19 and 21 develop positive average torque along a third line of action 32 with a lever arm 42. The line of action 32 corresponds ultimately to a line of action of the cylinders 19 and 21 positioned conventionally on the vehicle. In this conventional position of the cylinders 19 and 21, the lever arm 42 is small, and the torque developed by the cylinders 19 and 21 is slightly positive. Thus, if a failure of the drive device is experienced and the user operates the tailgate 14 manually (or in the manual mode generally), the user must then develop similar force to open the tailgate 14 according to the invention as for a tailgate equipped with cylinders mounted conventionally. The user then experiences the same "feel" when opening the tailgate 14 manually without the assistance of the defective drive device. Furthermore, when the drive device functions normally, the average torque developed along the line of action 32 allows the tailgate 14 to leave the closed position at a conventional speed. A user positioned in front of the tailgate 14 would then not be taken by surprise by the sudden opening of the tailgate 14. The average torque developed to exert a force on the tailgate 14 is thus optimized for manual operation.

Furthermore, in the closed position of the tailgate 14, the cylinders 19 and 21 exert torque tending to open the tailgate 14. However, as this torque is exerted along the median line of action 32, the average torque is of the same intensity as the torque with the cylinders 19 and 21 mounted conventionally.

In FIG. 1, the line of action 18 passes through the points 34 and 36, the line of action 20 passes through the points 38 and 40, and the line of action 32 passes through points 39 and 41. The line of action 18 forms the largest acute angle with the horizontal, while the line of action 20 forms a smaller acute angle with the horizontal. The median line of action 32 extends between the lines of action 18 and 20. The lines of action 18 and 32 pass above the hinge 16, which results in positive torque in the closed position of the tailgate 14. The line of action 20 passes below the hinge 16, which results in negative torque in the closed position of the tailgate 14. The flange 26 extends from the tailgate 14 towards the interior of the vehicle, the point 34 being closest to the tailgate 14 and the point 38 is furthest from the tailgate 14. A point 39 is between the points 34 and 38. The flange 28 extends from the body 12 towards the tailgate 14. The point 36 is the closest to the body 12, and the point 40 is furthest from the body 12. A point 41 is between the points 36 and 40. The arrangement of the points thus shows that the lines of action 18, 20 and 32 are secant. The cylinder 19 actuated by the drive device is coupled to the flange 26 at the point 34, closer to the tailgate 14 than the other cylinder 21. The cylinder 19 actuated by the drive device is coupled to the flange 28 at a point 36, which is closer to the body 12 than the other cylinder 21. The arrangement of the points thus shows that the lines of action 18, 20 and 32 are secant.

In FIG. 2, it can be seen that the lines of action 18, 20 and 32 are on the same side with respect to the hinge 16. The torques developed along these lines of action 18, 20 and 32 are thus all positive.

The operation of the tailgate 14 will now be explained in connection with FIGS. 1 and 2. In the closed position of the tailgate 14, the cylinders 19 and 21 develop opposing torques when the opening of the tailgate 14 is initiated. However, in the closed position of the tailgate 14, the cylinder 19 actuated by the drive device is designed to exert torque pushing the tailgate 14 towards the open position, with a lever arm 22 greater than the lever arm 24 of the cylinder 21. Thus, when the user initiates the opening of the tailgate 14, the user can only leave the closed position towards the open position by action of the drive device. The user does not then have to open the tailgate 14 manually.

As the average torque is positive, the tailgate 14 can leave the closed position. The point 38 is driven counter-clockwise rotatably around the hinge 16. The torque of the cylinder 21 tends to diminish in absolute value until it is cancelled out when the line of action 20 intersects with the hinge 16. However, the tailgate 14 continues its opening movement by the cylinder 19, of which the lever arm 22 has increased again, which allows the point 38 to continue its rotational movement around the hinge 16. The torque of the cylinder 21 then becomes positive and is added to the torque of the cylinder 19, as shown in FIG. 2. The tailgate 14 is accelerated in its opening movement until it reaches the open position. In the open position of the tailgate 14 in FIG. 2, the cylinders 19 and 21 are designed each to exert torque around the hinge 16, the torques being in the same direction. This ensures that the tailgate 14 is held in this position.

Figure 3:
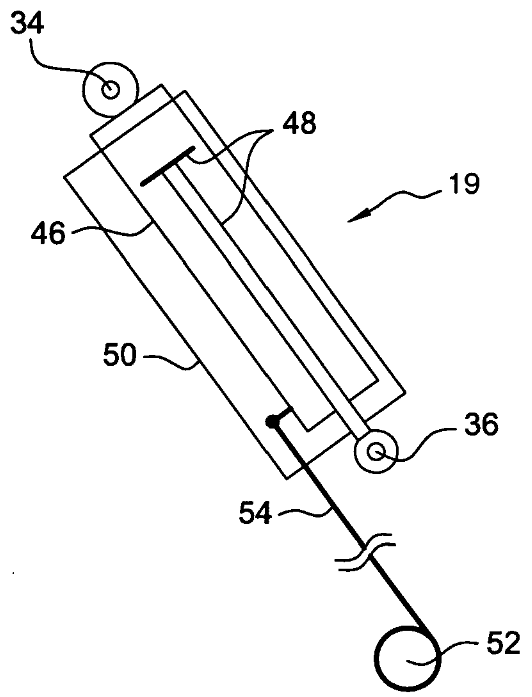
FIG. 3 illustrates a diagrammatic representation of a cylinder actuated by a motor.
Figure 4:
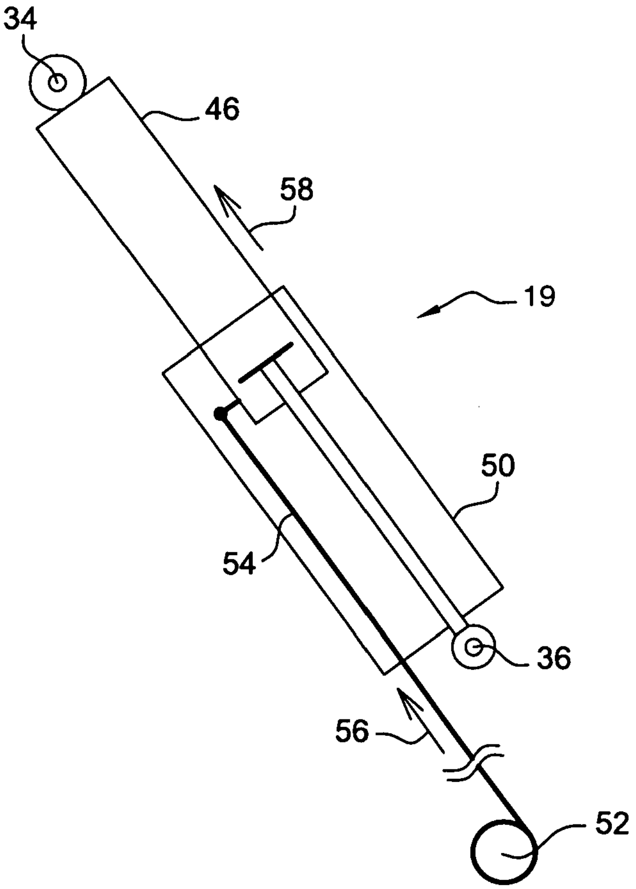
FIG. 4 illustrates a diagrammatic representation of the cylinder actuated by the motor.

The cylinders 19 and 21 are actuated by a drive device that will now be described. FIGS. 3 and 4 show diagrammatic representations of the cylinder 19 actuated by the drive device. FIGS. 3 and 4 show an example of the drive device. According to FIG. 3, the cylinder 19 implemented in the vehicle 10 is for example a cable type cylinder. The cylinder 19 is fixed by point 34 to the tailgate 14 and by the point 36 to the body 12. The cylinder 19 includes a tube 46 within which slides a piston and a rod 48. One end of the tube 46 is connected rotatably to the tailgate 14 at point 34, and one end of the rod 48 is connected rotatably to the body 12 at point 36. The tube 46 is itself included within a casing 50. The drive device includes a cable 54 and a motor 52. The cable 54 is fixed to one end of the tube 46, and the cable 54 is actuated by the motor 52 by being pulled or pushed depending on the direction of rotation of the motor 52. The casing 50 allows for the fastening of the cable 54 to the tube 46 to be hidden and protected. Of course, the cylinder 19 may be reversed, and the cable 54 may be fixed to the rod 48. The extension or retraction of the cylinder 19 is assisted by a compressed gas.

FIG. 4 shows the actuation of the cylinder 19 by the motor 52 of the drive device. By the motor 52 biasing or exerting a force on the cable 54 as indicated by the arrow 56, the tube 46 is moved with respect to the casing 50. In particular, the tube 46 is translated out of the casing 50 as indicated by the arrow 58, distancing the point 34 from the point 36. By this distancing, the point 34 undergoes a rotational movement in FIG. 1 around the hinge 16, which allows the hinge 16 to leave the closed position towards the open position. The cable 54, the construction of which is designed to work both in tension and in compression, is selected to be sufficiently rigid to be able to push the tube 46 out of the casing 50. The casing 50 includes a guide member (such as sheaths) to prevent the buckling of the cable 54 when in use. To change the tailgate 14 from the open position to the closed position, the motor 52 is actuated in reverse, pulling the cable 54. The cable 54 pulls the tube 46 towards the inside of the casing 50, bringing the points 34 and 36 closer together. The point 34 then undergoes a rotational movement in the opposite direction in FIG. 1, driving the tailgate 14 towards the closed position.

By the lever arm 22 of the cylinder 19, which has increased and is greater than the lever arm 24, the effort exerted by the motor 52 on the cable 54 is reduced. In fact, as the lever arm 22 has increased, the force developed by the cylinder 19, and therefore by the cable 54, can be reduced. This allows for the life of the cable 54 and therefore of the cylinder 19 to be extended. In comparison with a cylinder actuated by a motor and mounted conventionally along the line of action 32, the force to be developed by the conventional cylinder must be greater, as the lever arm 42 with respect to the hinge 16 is smaller. Under these conditions, the motor 52 is subject to greater stresses. In the example of a cylinder actuated by a motor by a cable, the stresses in the cable are thus greater and the life of the cable is reduced.

Figure 5:
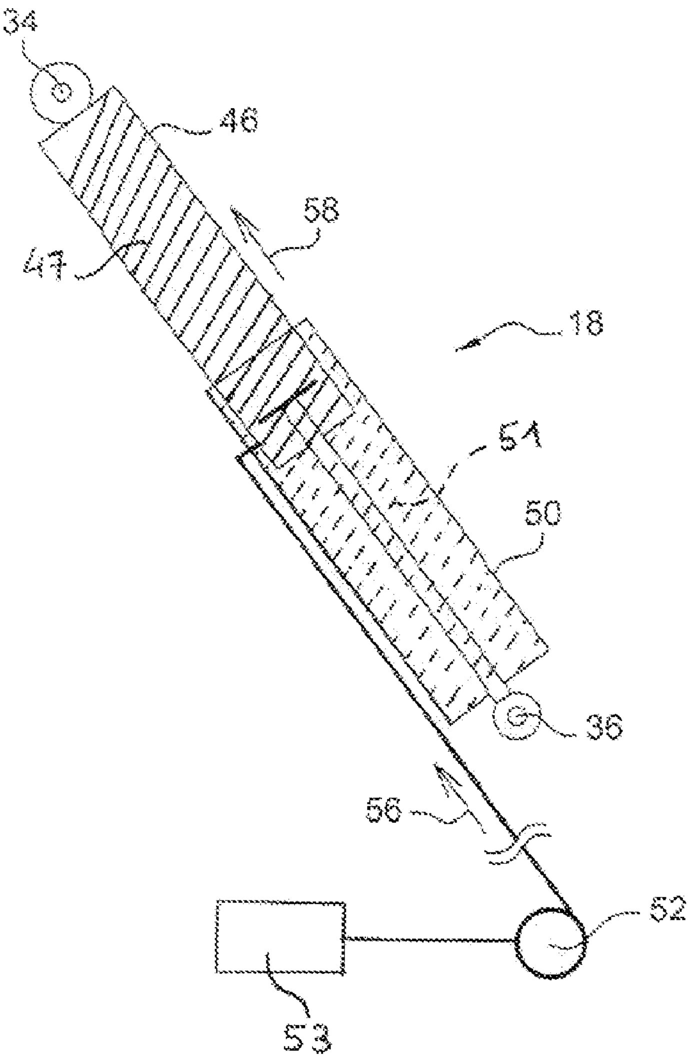
FIG. 5 illustrates a diagrammatic representation of the cylinder including threads actuated by the motor.

According to another embodiment of the drive device as shown in FIG. 5, the cylinder 19 includes a piston with a male thread 47 and a tube with a female thread 51 on an internal wall. The male thread 47 cooperates with the female thread 51 in the tube. The piston is driven rotatably by the drive device by a piston rod. The tube is prevented from rotating. The rotation of the piston by the drive device drives the tube in translation, which allows for the extension and retraction of the cylinder 19. The drive device is, for example, a motor connected to the piston by a rotating cable and a universal transmission. The extension or retraction of the cylinder is assisted by compressed gas.

The drive motor may be associated with an electronic control unit 53 equipped with an anti-pinch function and/or an anti-collision function for the tailgate movements. This function may include a conventional algorithm that includes measuring the parameters of the motor and in particular, the current passing through the motor and the angular position of the rotor shaft of the motor. For example, when the current value, combined with a motor position, exceeds a pre-determined threshold value, the electronic control unit interprets this as the presence of an obstacle in the path of the tailgate and issues a command to stop, or even to reverse, the direction of rotation of the motor.

This function may include a detection feature as known in the art, such as sensitive seals around the vent, or non-contact optical systems, or combinations of these methods.

Of course, the invention is not limited to the embodiments described as an example. In particular, the relative position of the flanges 26 and 28 can be reversed. The description of the operation of the tailgate 14 must then be adapted, in particular as regards the direction of the torque exerted by the cylinders, as the immobile flange on the body would become higher than the mobile flange on the tailgate.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is

1. A vehicle comprising:

a body;

a tailgate coupled to the body by a hinge, wherein the tailgate is moveable between a closed position and an open position; and a first cylinder and a second cylinder biasing the tailgate with respect to the body, wherein the first cylinder is actuated by a drive device, and a first lever arm of the first cylinder with respect to the hinge is greater than a second lever arm of the second cylinder with respect to the hinge when the tailgate is in the closed position.

2. The vehicle according to claim 1, wherein the first cylinder exerts a torque pushing the tailgate towards the open position when the tailgate is in the closed position.

3. The vehicle according to claim 1, wherein the first cylinder and the second cylinder are each designed to exert a torque around the hinge in opposing directions when the tailgate is in the closed position.

4. The vehicle according to claim 1, wherein the first cylinder and the second cylinder are each designed to exert a torque around the hinge in a common direction when the tailgate is in the open position.

5. The vehicle according to claim 1, wherein the first cylinder and the second cylinder exert an average torque that pushes the tailgate towards the open position when the tailgate is in the closed position.

6. The vehicle according to claim 1, wherein the drive device includes a cable actuated by a motor, and the first cylinder is extended or retracted by the cable.

7. The vehicle according to claim 1, wherein the first cylinder includes a piston having a male thread and a tube having a female thread, wherein the male thread cooperates with the female thread, and wherein the piston is driven rotatably by the drive device to drive the tube in translation.

8. The vehicle according to claim 1, wherein the drive device includes:

a motor, and an electronic control unit associated with the motor, wherein the electronic control unit provides at least one of an anti-pinch function and an anti-collision function for moving the tailgate.

9. The vehicle according to claim 8, wherein the first cylinder and the second cylinder are each coupled to the body and to the tailgate.

10. The vehicle according to claim 9, further including a flange connected to the tailgate, wherein the first cylinder is coupled to the flange at a first point and the second cylinder is coupled to the flange at a second point, the first point and the second point being arranged asymmetrically with respect to a longitudinal plane of symmetry of the vehicle.

11. The vehicle according to claim 9, further including a flange connected to the body, wherein the first cylinder is coupled to the flange at a first point and the second cylinder is coupled to the flange at a second point, the first point and the second point being arranged asymmetrically with respect to a longitudinal plane of symmetry of the vehicle.

12. A vehicle comprising:

a body;

a tailgate coupled to the body by a hinge, wherein the tailgate is moveable between a closed position and an open position; and a first cylinder and a second cylinder coupled to the body and to the tailgate, wherein the first cylinder and the second cylinder bias the tailgate with respect to the body, the first cylinder is actuated by a drive device, and a first lever arm of the first cylinder with respect to the hinge is greater than a second lever arm of the second cylinder with respect to the hinge when the tailgate is in the closed position.

13. The vehicle according to claim 12, wherein the first cylinder and the second cylinder are each designed to exert a torque around the hinge in opposing directions when the tailgate is in the closed position.

14. The vehicle according to claim 12, wherein the first cylinder and the second cylinder are each designed to exert a torque around the hinge in a common direction when the tailgate is in the open position.

15. The vehicle according to claim 12, wherein the first cylinder and the second cylinder exert an average torque pushing the tailgate towards the open position when the tailgate is in the closed position.

16. The vehicle according to claim 12, further including a flange connected to the tailgate, wherein the first cylinder is coupled to the flange at a first point and the second cylinder is coupled to the flange at a second point, the first point and the second point being arranged asymmetrically with respect to a longitudinal plane of symmetry of the vehicle.

17. The vehicle according to claim 12, further including a flange connected to the body, wherein the first cylinder is coupled to the flange at a first point and the second cylinder is coupled to the flange at a second point, the first point and the second point being arranged asymmetrically with respect to a longitudinal plane of symmetry of the vehicle.

18. A vehicle comprising:

a body;

a tailgate coupled to the body by a hinge, wherein the tailgate is moveable between a closed position and an open position; and a first cylinder and a second cylinder biasing the tailgate with respect to the body, wherein the first cylinder is actuated by a drive device, and a first lever arm of the first cylinder with respect to the hinge is greater than a second lever arm of the second cylinder with respect to the hinge when the tailgate is in the closed position, and wherein the first cylinder and the second cylinder each exert a torque around the hinge in opposing directions when the tailgate is in the closed position.

19. The vehicle according to claim 18, wherein the first cylinder and the second cylinder exert an average torque that pushes the tailgate towards the open position when the tailgate is in the closed position.

20. The vehicle according to claim 18, wherein the first cylinder and the second cylinder are each coupled to the body and to the tailgate.

* * * * *